United States Patent
Sekiguchi

(10) Patent No.: US 9,019,398 B2
(45) Date of Patent: Apr. 28, 2015

(54) COMMUNICATION APPARATUS CAPABLE OF USING A RECORDING MEDIUM THAT HAS A COMMUNICATION FUNCTION FOR COMMUNICATING WIRELESSLY WITH ANOTHER APPARATUS AND CONTROL METHOD THEREFOR

(71) Applicant: Canon Kabushiki Kaisha, Tokyo (JP)

(72) Inventor: Tomohiro Sekiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/780,542

(22) Filed: Feb. 28, 2013

(65) Prior Publication Data

US 2013/0235217 A1    Sep. 12, 2013

(30) Foreign Application Priority Data

Mar. 7, 2012    (JP) .................................. 2012-050948

(51) Int. Cl.
*H04N 5/76* (2006.01)
*H04N 1/00* (2006.01)
*H04N 5/232* (2006.01)

(52) U.S. Cl.
CPC .... *H04N 1/00214* (2013.01); *H04N 2201/0086* (2013.01); *H04N 1/00347* (2013.01); *H04N 1/0097* (2013.01); *H04N 2201/0055* (2013.01); *H04N 2201/0084* (2013.01); *H04N 2201/0087* (2013.01)

(58) Field of Classification Search
USPC ........... 348/211.2, 211.4–211.6, 222.1, 231.9
See application file for complete search history.

(56) References Cited

U.S. PATENT DOCUMENTS

| | | | | |
|---|---|---|---|---|
| 6,628,325 | B1 * | 9/2003 | Steinberg et al. | 348/211.1 |
| 6,715,003 | B1 * | 3/2004 | Safai | 710/33 |
| 7,382,978 | B2 * | 6/2008 | Kaku | 396/321 |
| 7,432,952 | B2 * | 10/2008 | Fukuoka | 348/207.1 |
| 7,663,674 | B2 * | 2/2010 | Billerbeck | 348/231.6 |
| 8,392,957 | B2 * | 3/2013 | Holt et al. | 725/105 |
| 8,804,008 | B2 * | 8/2014 | Tsujii | 348/231.8 |

FOREIGN PATENT DOCUMENTS

| | | |
|---|---|---|
| JP | 2005-100103 A | 4/2005 |
| JP | 2008-147891 A | 6/2008 |

* cited by examiner

*Primary Examiner* — Ngoc-Yen Vu
(74) *Attorney, Agent, or Firm* — Carter, DeLuca, Farrell & Schmidt, LLP

(57) ABSTRACT

There is provided a communication apparatus. The holding unit holds communication setting information for communicating wirelessly with an external apparatus. The communication unit communicates wirelessly with the external apparatus using the communication setting information held by the holding unit. The connection unit connects a recording medium. The determination unit determines whether or not the recording medium connected to the connection unit has a communication function for communicating wirelessly with an apparatus, which is different from the communication apparatus, using communication setting information that has been written into a specific recording region of the recording medium. The writing unit writes the communication setting information held by the holding unit into the specific recording region of the recording medium in a case where it has been determined that the recording medium connected to the connection unit has the communication function.

19 Claims, 5 Drawing Sheets

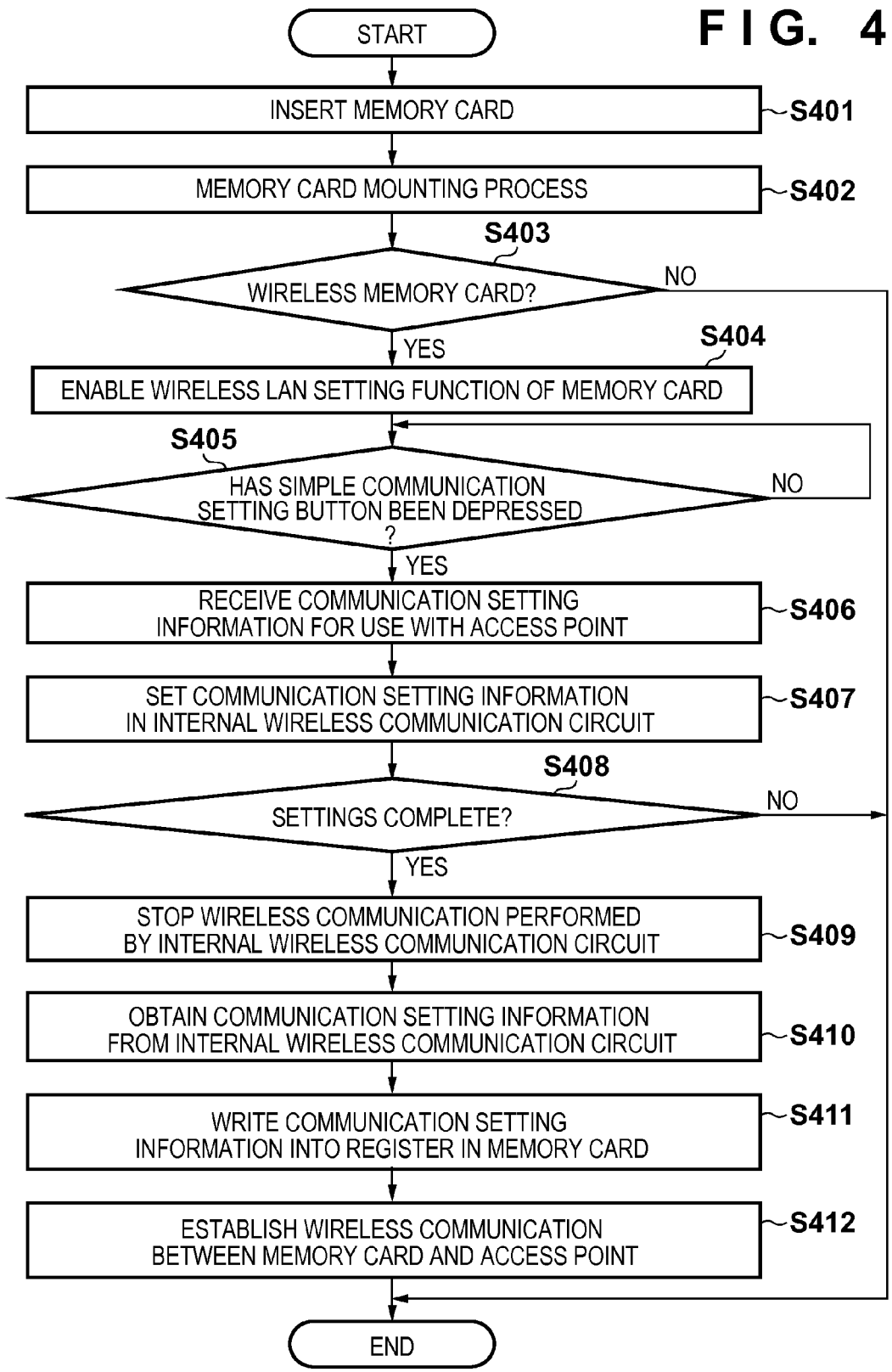

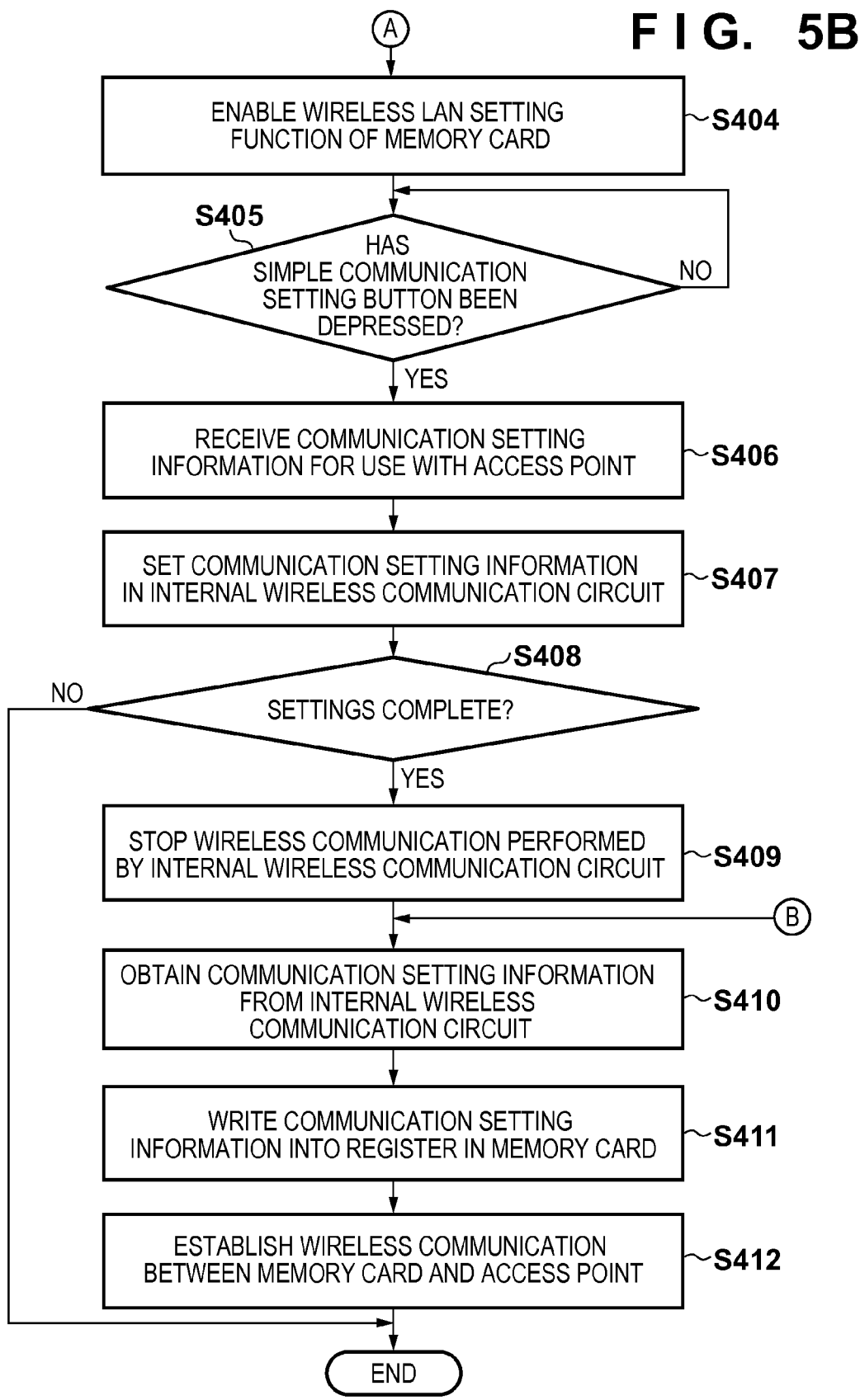

COMMUNICATION APPARATUS CAPABLE OF USING A RECORDING MEDIUM THAT HAS A COMMUNICATION FUNCTION FOR COMMUNICATING WIRELESSLY WITH ANOTHER APPARATUS AND CONTROL METHOD THEREFOR

BACKGROUND OF THE INVENTION

1. Field of the Invention

The present invention relates to techniques for controlling communication apparatuses.

2. Description of the Related Art

Mobile devices, such as digital cameras and the like, that have wireless communication functions installed therein, are beginning to spread. In order to make wireless communication settings for the internal wireless functions in such mobile devices, it is necessary to operate the mobile device itself and input communication setting information. However, mobile devices generally have only small operating units, and thus inputting complex communication setting information by hand places a burden on the user.

Meanwhile, recording media that have the same shape as normal memory cards but also include wireless communication functions (called "wireless memory cards" hereinafter) are known (see Japanese Patent Laid-Open No. 2005-100103). Wireless memory cards automatically send files recorded in a memory region of the card to an external apparatus that has been set in advance using wireless communication.

At present, several techniques are known for executing the wireless communication settings for an internal wireless function of a mobile device with ease. For example, a method in which communication settings of a wireless LAN are automatically made for a mobile device by operating specific buttons or the like on the mobile device and the wireless LAN access point at the same time is becoming common. In addition, a method that copies wireless setting information set in a digital camera onto a removable recording medium and imports the communication setting information into a new digital camera is also known (see Japanese Patent Laid-Open No. 2008-147891).

However, a technique for easily executing wireless communication settings on a wireless memory card such as that disclosed in Japanese Patent Laid-Open No. 2005-100103 is, at present, not known. Presently, in the case where wireless communication settings are to be made for a wireless memory card, it is common for the communication setting information to be sent to the wireless memory card from a personal computer (PC) via a card reader or the like. Accordingly, it has been necessary for a user to perform complicated operations, such as removing the wireless memory card from the mobile device, inserting the wireless memory card into the card reader of a PC, and so on.

SUMMARY OF THE INVENTION

Having been achieved in light of the aforementioned circumstances, the present invention provides a technique for simplifying the execution of wireless communication settings in a recording medium having a wireless communication function.

According to an aspect of the present invention, there is provided a communication apparatus comprising: a holding unit configured to hold communication setting information for communicating wirelessly with an external apparatus; a communication unit configured to communicate wirelessly with the external apparatus using the communication setting information held by the holding unit; a connection unit configured to connect a recording medium; a determination unit configured to determine whether or not the recording medium connected to the connection unit has a communication function for communicating wirelessly with an apparatus, which is different from the communication apparatus, using communication setting information that has been written into a specific recording region of the recording medium; and a writing unit configured to write the communication setting information held by the holding unit into the specific recording region of the recording medium in a case where it has been determined that the recording medium connected to the connection unit has the communication function.

According to another aspect of the present invention, there is provided a control method for a communication apparatus that includes a holding unit configured to hold communication setting information for communicating wirelessly with an external apparatus, a communication unit configured to communicate wirelessly with the external apparatus using the communication setting information held by the holding unit, and a connection unit configured to connect a recording medium, the method comprising steps of: determining whether or not the recording medium connected to the connection unit has a communication function for communicating wirelessly with an apparatus, which is different from the communication apparatus, using communication setting information that has been written into a specific recording region of the recording medium; and writing the communication setting information held by the holding unit into the specific recording region of the recording medium in a case where it has been determined that the recording medium connected to the connection unit has the communication function.

According to the aforementioned configuration of the present invention, it is possible to simplify the execution of wireless communication settings in a recording medium having a wireless communication function.

Further features of the present invention will become apparent from the following description of an exemplary embodiment with reference to the attached drawings.

BRIEF DESCRIPTION OF THE DRAWINGS

FIG. 4 is a flowchart illustrating the flow of a process for making wireless communication settings in the memory card 120, according to the first embodiment.

FIGS. 5A and 5B are flowcharts illustrating the flow of a process for making wireless communication settings in the memory card 120, according to a second embodiment.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

The following embodiments will describe a digital video camera as an example of a communication apparatus. However, the communication apparatus is not limited to a digital video camera, and may, for example, be a digital still camera, a mobile telephone having a card slot, a tablet device, or the like.

First Embodiment

Figure 1:
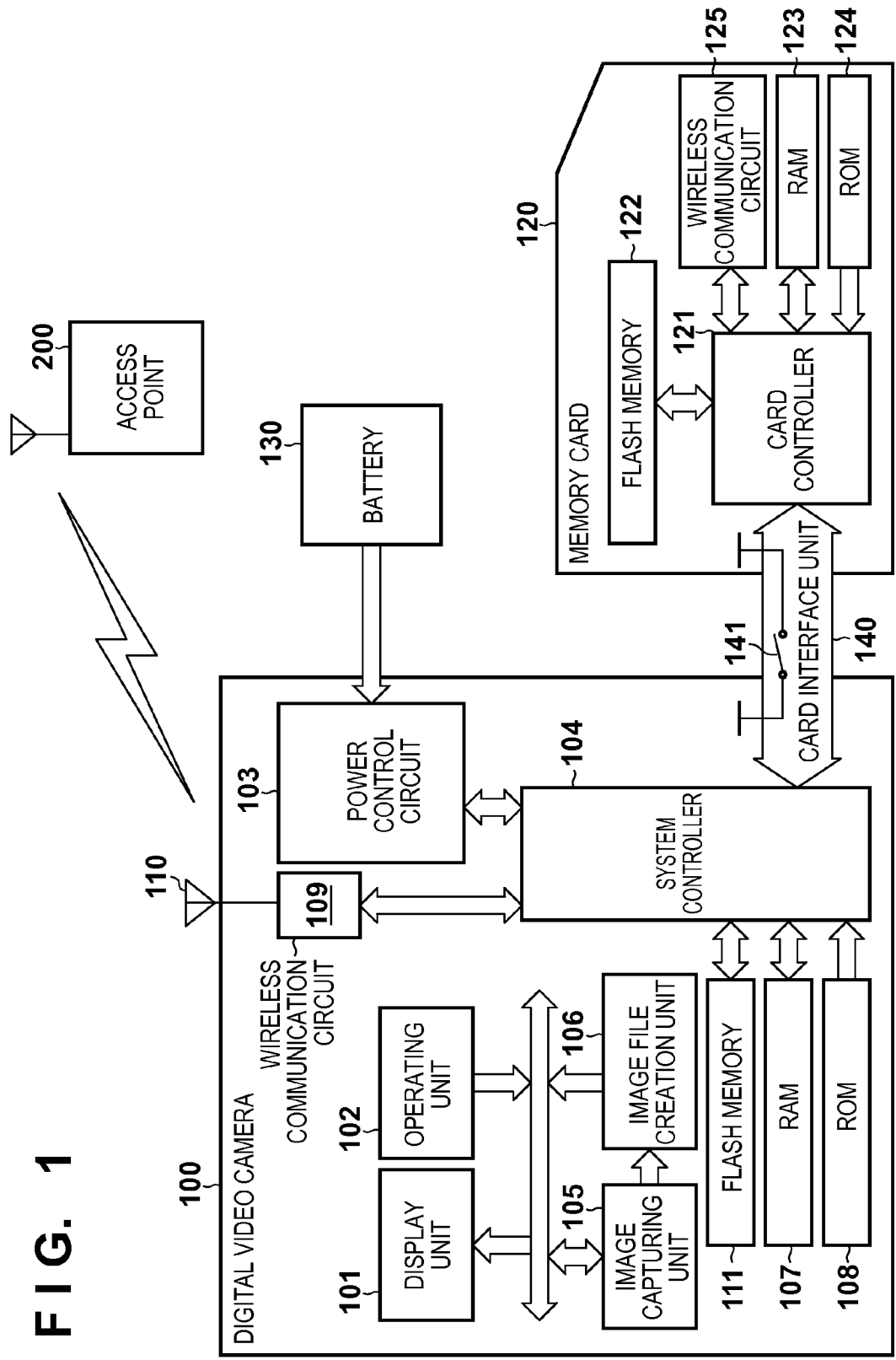
FIG. 1 is a block diagram illustrating the configuration of a digital video camera 100 and a memory card 120 that is a recording medium having a wireless communication function (that is, a wireless memory card) according to a first embodiment.

FIG. 1 is a block diagram illustrating the configuration of a digital video camera 100 and a memory card 120 that is a recording medium having a wireless communication function (that is, a wireless memory card) according to a first embodiment.

First, the digital video camera 100 will be described. A system controller 104 is an MPU (micro processing unit), and includes a processor core as well as peripheral circuits such as a generic I/O port, an A/D converter and the like, and so on. The system controller 104 controls the digital video camera 100 as a whole in accordance with input signals from the various units in the digital video camera 100, programs, and so on. In addition, a RAM 107 serving as a primary storage apparatus, a ROM 108 serving as a secondary storage apparatus in which programs are stored, and a flash memory 111 are connected to the system controller 104.

Note that the control of the digital video camera 100 is not limited to the form described here, and for example, multiple control units may control the various functions while dividing up processes amongst themselves, or the various functions may be controlled using a single piece of hardware.

An image capturing unit 105 obtains image data by capturing an image of a subject. An image file creation unit 106 converts the image data obtained by the image capturing unit 105 into an image file. A detection switch 141 detects that the memory card 120 is inserted (connected) via a card interface unit 140. When the memory card 120 is inserted and the detection switch 141 is switched on, the system controller 104 can detect that the memory card 120 is inserted. After this detection, the system controller 104 can send a command for obtaining information of the memory card 120 to a card controller 121, and can then detect the type of the card from information received from the card controller 121. Based on the type that has been detected, the digital video camera 100 can then determine whether or not the memory card 120 inserted therein is a wireless memory card.

The system controller 104 can write the image file (image data) created by the image file creation unit 106 into the memory card 120 through the card interface unit 140. In addition, the system controller 104 can read out image files recorded in a flash memory 122 of the memory card 120. The card interface unit 140 can input/output signals to/from the memory card 120 at specified timings. In addition, the card interface unit 140 can control a supply of power to the memory card 120 to turn on/off.

A display unit 101 is used to display various types of information, such as displaying system information, displaying playback images of recorded image files, displaying a menu regarding wireless communication settings, and so on. An operating unit 102 includes buttons through which a user makes various types of operations, and communicates instructions to the system controller 104 in accordance with the operations made by the user. The operating unit 102 includes a simple communication setting button for starting a communication setting process with the access point (AP) 200.

Power is supplied to the digital video camera 100 from a battery 130, which is a secondary cell. A power control circuit 103 detects an output voltage of the battery 130 and notifies the system controller 104 thereof. A wireless communication circuit 109 is a circuit for performing wireless communication. An antenna 110 is an antenna for performing wireless communication using the wireless communication circuit 109.

Next, the memory card 120 will be described. The memory card 120 includes the card controller 121, the flash memory 122, a RAM 123, a ROM 124, and a wireless communication circuit 125. The card controller 121 is an MPU, and the RAM 123 serving as a primary storage apparatus, the ROM 124 serving as a secondary storage apparatus that stores programs, the flash memory 122, and the wireless communication circuit 125 are connected thereto.

Here, operations performed by the memory card 120 will be briefly described. The memory card 120 is a wireless memory card in which the wireless communication circuit 125 is installed (that is, the memory card 120 has a wireless communication function). When the card controller 121 controls the wireless communication circuit 125, image files written from the digital video camera 100 can be sent wirelessly to an external apparatus. The flash memory 122 has a storage capacity of, for example, several GB (gigabytes) to several tens of GB, and the user can use the memory card 120 to store image files in the same manner as with a normal memory card.

The card controller 121 writes image files to the flash memory 122 and reads image files from the flash memory 122 in response to commands from the system controller 104 of the digital video camera 100, which serves as a host. Control related to the wireless communication function, inquiries for information, and so on are controlled by the system controller 104 of the digital video camera 100, which serves as the host, exchanging specialized commands with the card controller 121.

Under the control of the card controller 121, the wireless communication circuit 125 wirelessly communicates with the external apparatus using the communication setting information written into a specific recording region of the memory card 120. For example, a register in the wireless communication circuit 125 can be used as the specific recording region. Alternatively, a private region may be provided in the flash memory 122, and that region may then be used as the specific recording region. Further still, a specific folder may be provided, and that folder may then be used as the specific recording region. In order to write the communication setting information into the memory card 120, the user can send the communication setting information to the memory card 120 from a PC by, for example, inserting the memory card 120 into the card reader of the PC and operating the PC. However, as described earlier, this method is complicated for the user. In addition, in the case of the memory card 120, it is difficult to employ a wireless communication setting method that uses a simple button operation, as will be described later with reference to FIG. 3. This is because it is difficult to provide an operating unit in the memory card 120. Therefore, in the present embodiment, a technique for simplifying the execution of wireless communication settings is employed; this technique will be described later with reference to FIG. 4.

After the wireless communication settings have been made, upon the card controller 121 detecting that an image file has been written from the system controller 104, the card controller 121 automatically sends the written image file to the external AP 200 via the wireless communication circuit 125.

Figure 2:
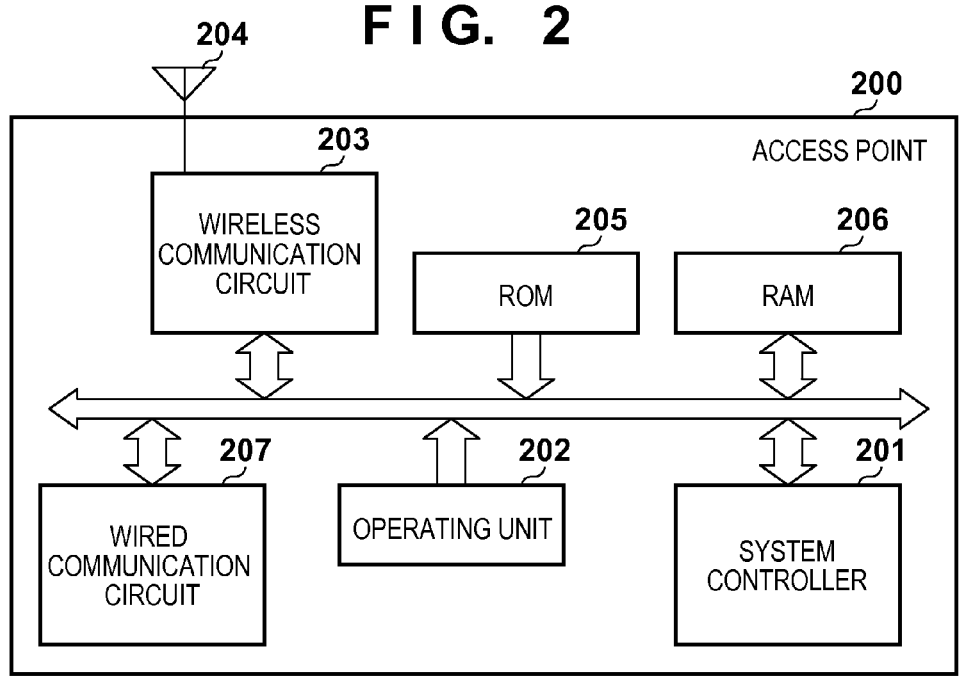
FIG. 2 is a block diagram illustrating the configuration of an access point (AP) 200 that is capable of wirelessly communicating with the digital video camera 100 and the memory card 120.

Next, the configuration of the AP 200 that is capable of wirelessly communicating with the digital video camera 100 and the memory card 120 will be described with reference to FIG. 2. A system controller 201 is an MPU, and includes a processor core as well as peripheral circuits such as a generic I/O port. A RAM 206 serving as a primary storage apparatus and a ROM 205 serving as a secondary storage apparatus in which programs are stored are connected to the system controller 201. A wireless communication circuit 203 is a circuit for wirelessly communicating with a wireless client such as the digital video camera 100, the memory card 120, or the like. An antenna 204 is an antenna for performing wireless communication using the wireless communication circuit 203. A wired communication circuit 207 is a circuit for performing hard-wired communication through a LAN cable connection. The AP 200 can connect to a digital device such as a PC, the Internet, or the like via this wired communication circuit 207.

Figure 3:
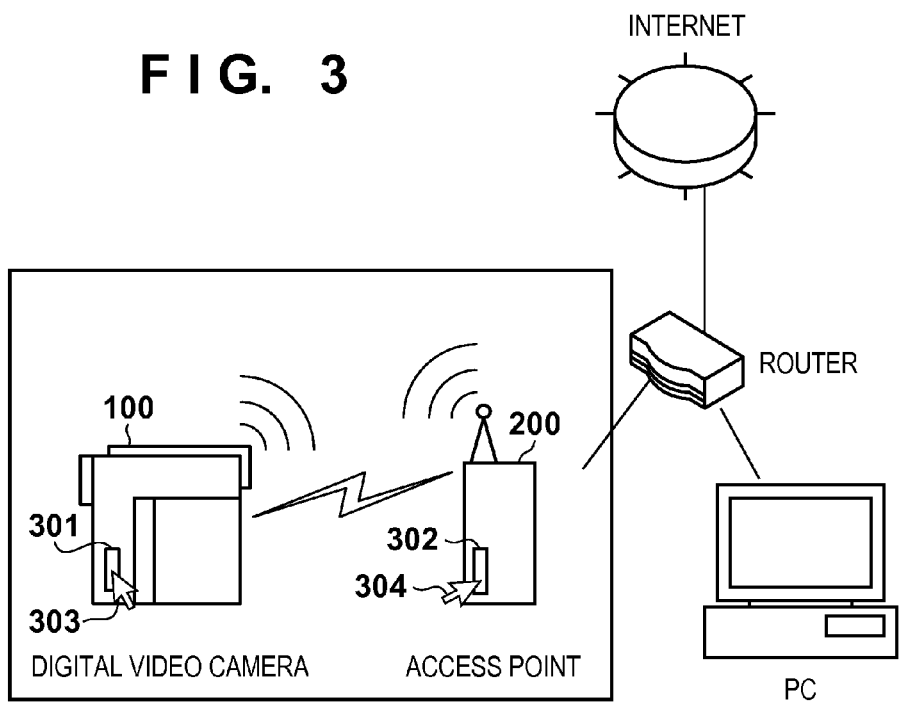
FIG. 3 is a schematic diagram illustrating wireless communication settings made using a simple communication setting button.

Next, control for sending data (image files and the like) using the wireless communication circuit 109 of the digital video camera 100 will be described. As shown in FIG. 1, the digital video camera 100 according to the present embodiment includes the wireless communication circuit 109. Using this wireless communication circuit 109, the digital video camera 100 can, for example, connect to a network managed by the AP 200. Note that the digital video camera 100 saves communication setting information such as an SSID (service set identifier), an encryption scheme, an encryption key, and so on of the network managed by the AP 200 in the flash memory 111 in advance. A method in which the simple communication setting button included in the operating unit 102 of the digital video camera 100 is operated at the same time as a simple communication setting button included in an operating unit 202 of the AP 200 can be given as an example of a method for obtaining the communication setting information (see FIG. 3). As shown in FIG. 3, the digital video camera 100 includes a simple communication setting button 301, and the AP 200 includes a simple communication setting button 302. As indicated by arrows 303 and 304, the digital video camera 100 and the AP 200 exchange communication setting information (parameters) in response to the simple communication setting buttons 301 and 302 being operated at the same time. The digital video camera 100 then writes the communication setting information into the flash memory 111.

After the stated communication settings have been made, the system controller 104 connects to the network using the wireless communication circuit 109. Upon detecting an external apparatus to which image files can be sent on the network, the system controller 104 sends the image file recorded in the memory card 120 using wireless communication. Note that the destination of the image file and the image file that is to be sent may be selected through user operations after the external apparatus has been detected, or may be determined in advance through user operations. Note also that the system controller 104 can turn the output of radio waves for wireless communication on/off by, for example, controlling the wireless communication circuit 109 based on user operations.

Here, a case in which the memory card 120 has been inserted in the digital video camera 100 will be considered. In this case, two wireless communication units, or the wireless communication circuit 109 and the wireless communication circuit 125, are present. Furthermore, because the user of the digital video camera 100 can be assumed to be the same user as the user of the memory card 120, there is thought to be a high likelihood that the same communication setting information will be used. Accordingly, it is inefficient to make the wireless communication settings for the wireless communication circuit 109 and the wireless communication settings for the wireless communication circuit 125 completely separately. Therefore, according to the present embodiment, the execution of the wireless communication settings for the memory card 120 can be made easily and efficiently. The wireless communication settings according to the present embodiment will be described in detail hereinafter with reference to FIG. 4.

FIG. 4 is a flowchart illustrating the flow of a process for making wireless communication settings in the memory card 120, according to the first embodiment. The processes of each step in this flowchart are, unless otherwise specified, executed by the system controller 104 executing programs stored in the ROM 108. In the present embodiment, IEEE 802.11 will be used as an example of a wireless communication technique.

When, in step S401, the memory card 120 is inserted in the card interface unit 140 of the digital video camera 100, the detection switch 141 is turned on. In response to this, in step S402, the system controller 104 exchanges commands with the card controller 121 via the card interface unit 140, and executes a process for mounting the memory card 120.

In step S403, the system controller 104 determines whether or not the inserted memory card 120 is a wireless memory card (in other words, whether or not the memory card 120 has a wireless communication function). The processing of the flowchart ends in the case where the memory card 120 is not a wireless memory card. In the case, however, where the memory card 120 is a wireless memory card, the processing advances to step S404.

In step S404, the system controller 104 enables a wireless LAN setting function of the memory card 120. In step S405, the system controller 104 stands by until the simple communication setting button 301 provided in the operating unit 102 is depressed, and when the stated button has been depressed, the processing advances to step S406. It is assumed that the simple communication setting button 302 provided in the operating unit 202 of the AP 200 is depressed at the same time that the simple communication setting button 301 is depressed.

In step S406, the system controller 104 starts wireless LAN communication settings between the wireless communication circuit 109 of the digital video camera 100 and the wireless communication circuit 203 of the AP 200. The communication setting information of the wireless LAN includes an SSID, an encryption scheme, an encryption key, and so on. The system controller 104 receives the communication setting information from the AP 200, and stores that information in the flash memory 111. In step S407, the system controller 104 executes control for setting the communication setting information held in the flash memory 111 in a register of the wireless communication circuit 109 (holding control).

In step S408, the system controller 104 determines whether or not the setting of the communication setting information has succeeded and is thus complete. This determination can, for example, be executed based on whether or not wireless communication has been established between the wireless communication circuit 109 and the AP 200. In the case where the setting has failed, the processing illustrated in this flowchart ends. The process advances to step S409 in the case where the setting has succeeded.

In step S409, the system controller 104 stops the wireless communication (the sending of image files and the like) performed by the wireless communication circuit 109. In step S410, the system controller 104 reads out the communication setting information set in the wireless communication circuit 109 and holds that information in the RAM 107.

In step S411, the system controller 104 sends the communication setting information read out in step S410 to the memory card 120 using a dedicated command for configuring the wireless communication function in the memory card 120 through the card interface unit 140. Through this, the system controller 104 writes the communication setting information into a register of the wireless communication circuit 125 through the card controller 121.

Note that the system controller 104 may automatically execute the processing from step S409 to step S411 (that is, the process for writing the communication setting information of the digital video camera 100 into a register of the wireless communication circuit 125), without any particular instructions from the user. Alternatively, the system controller 104 may, for example, display guidance (a selection screen) before step S409 and allow the user to select whether or not to execute the process for writing the communication setting information of the digital video camera 100 into a register of the wireless communication circuit 125.

Following the writing of the communication setting information in step S411, in step S412, the system controller 104 starts wireless communication between the memory card 120 and the AP 200 by sending a dedicated command for starting communication to the card controller 121. Although wireless communication is started between the memory card 120 and the AP 200 in step S412, it should be noted that wireless communication may be established between the wireless communication circuit 109 and the AP 200 by operating the wireless communication circuit 109 after the wireless communication settings have been completed for the memory card 120 instead. Alternatively, the system controller 104 may display guidance enabling the user to select whether to establish wireless communication with the AP 200 using the wireless communication circuit 109 or the wireless communication circuit 125. In this case, wireless communication is established with the AP 200 based on the selection made by the user.

As described thus far, according to the present embodiment, the digital video camera 100 sets the communication setting information in the wireless communication circuit 109 installed therein in response to the simple communication setting button 301 being operated, and the communication setting information is then written into the wireless communication circuit 125 of the memory card 120. As a result, the execution of the wireless communication settings in the memory card 120 is simplified.

Second Embodiment

In the first embodiment, the digital video camera 100 sets the communication setting information in the wireless communication circuit 109 provided therein using the simple communication setting button 301, and then writes the communication setting information into the memory card 120. However, the writing of the communication setting information into the memory card 120 is not limited to the timing at which the communication setting information is set in the wireless communication circuit 109, and can be executed at any desired timing. In addition, the setting of the communication setting information in the wireless communication circuit 109 is not limited to a method that uses the simple communication setting button 301, and can be executed using any desired method. Accordingly, the second embodiment implements a more generalized version of the first embodiment. Note that in the second embodiment, the basic configurations of the digital video camera 100, the memory card 120, and the AP 200 are the same as those in the first embodiment, and thus detailed descriptions thereof will be omitted.

Figure 5A:
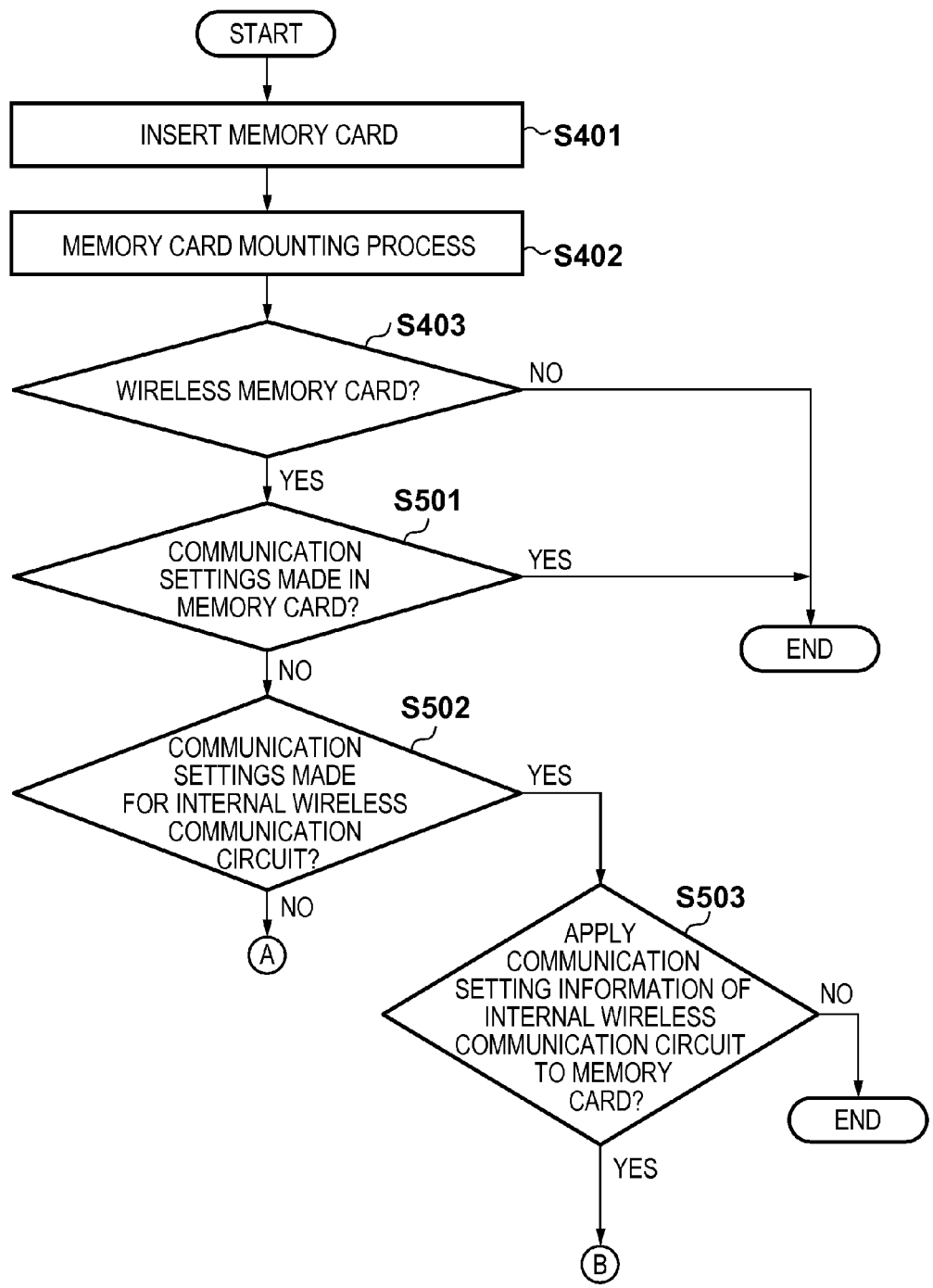

FIGS. 5A and 5B are flowcharts illustrating the flow of a process for making wireless communication settings in the memory card 120, according to the second embodiment. The processes of each step in these flowcharts are, unless otherwise specified, executed by the system controller 104 executing programs stored in the ROM 108. In addition, in these flowcharts, steps that are assigned the same reference numerals as those in FIG. 4 execute the same processes as those indicated in FIG. 4.

In step S501, the system controller 104 obtains the communication setting information from the memory card 120 by sending a dedicated command to the card controller 121. The system controller 104 refers to the obtained communication setting information and determines whether or not communication settings have been made in the memory card 120. The processing of the flowchart ends in the case where communication settings have been made in the memory card 120. When such is not the case, the process advances to S502.

In step S502, the system controller 104 determines whether or not communication settings have been made in the internal wireless communication circuit 109. The process advances to step S404 in the case where communication settings have not been made in the wireless communication circuit 109, after which the same processing as indicated in step S404 to step S412 in the first embodiment is executed. However, in step S405, instead of performing the wireless communication settings using the simple communication setting button 301, the wireless communication settings may be inputted manually by the user using, for example, a keyboard or the like included as part of the operating unit 102. On the other hand, in the case where the communication settings have been made in the wireless communication circuit 109, the process advances to step S503.

In step S503, the system controller 104 displays a selection screen that allows the user to select whether or not to apply the communication setting information in the internal wireless communication circuit 109 to the memory card 120 as well. As can be seen from steps S403, S502, and S503, in the case where the wireless communication circuit 109 holds communication setting information and the memory card 120 is a wireless memory card, the selection screen is displayed automatically. In the case where the user has selected an option to apply the information, the process advances to step S410; in steps S410 and S411, a process for writing the communication setting information of the wireless communication circuit 109 into the memory card 120 is carried out, in the same manner as in the first embodiment. On the other hand, in the case where the user has selected an option to not apply the information, the processing of the flowchart ends.

As described above, according to the present embodiment, in the case where communication settings have been made in the internal wireless communication circuit 109, the digital video camera 100 writes the communication setting information of the wireless communication circuit 109 into the memory card 120. On the other hand, in the case where communication settings have not been made in the internal wireless communication circuit 109, the digital video camera 100 writes the communication setting information of the wireless communication circuit 109 into the memory card 120 after the communication settings have been made using some other method, including manual input on the part of the user. As a result, the execution of the wireless communication settings in the memory card 120 is simplified.

Note that in the present embodiment, after the memory card 120 has been inserted (step S401), the digital video camera 100 displays the selection screen for selecting whether or not to apply the communication setting information of the internal wireless communication circuit 109 to the memory card 120 as well (step S503). However, the timing at which the selection screen is displayed is not necessarily limited thereto. For example, it is possible to prepare a menu reading "apply wireless settings of digital video camera to memory card", and apply the communication settings to the memory card 120 when the user performs a menu operation at a desired timing.

It is also possible to omit the display of the selection screen in step S503. In the case where the selection screen display is omitted, the system controller 104 can automatically write the communication setting information into the memory card 120 in the case where the wireless communication circuit 109 holds the communication setting information and the memory card 120 is a wireless memory card.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-050948, filed on Mar. 7, 2012, which is hereby incorporated by reference herein in its entirety.

What is claimed is:

1. A communication apparatus comprising:
   a holding unit configured to hold communication setting information for communicating wirelessly with an external apparatus;
   a communication control unit configured to control a wireless communication unit to communicate wirelessly with the external apparatus using the communication setting information held by the holding unit
   a connection unit configured to connect to a recording medium;
   a determination unit configured to determine whether or not the recording medium connected to the connection unit has a communication function for communicating wirelessly with an apparatus, which is different from the communication apparatus, using communication setting information that has been written into a specific recording region of the recording medium; and
   a writing unit configured to write the communication setting information held by the holding unit into the specific recording region of the recording medium in a case where it has been determined that the recording medium connected to the connection unit has the communication function.

2. The communication apparatus according to claim 1, further comprising:
   a receiving unit configured to receive the communication setting information from the external apparatus,
   wherein the holding unit holds the received communication setting information, and
   wherein the writing unit writes the received communication setting information into the specific recording region of the recording medium in response to the received communication setting information being held by the holding unit.

3. The communication apparatus according to claim 2, further comprising:
   an operating unit configured to allow a user to instruct the communication setting information to be received from the external apparatus,
   wherein the external apparatus includes an operating unit configured to allow the user to instruct the communication setting information to be sent to the communication apparatus, and
   wherein the receiving unit receives the communication setting information from the external apparatus in response to the operating unit of the communication apparatus and the operating unit of the external apparatus being operated at the same period of time.

4. The communication apparatus according to claim 1, further comprising:
   a receiving unit configured to receive communication setting information from the external apparatus; and
   a unit configured to display, in response to the received communication setting information being held by the holding unit, a selection screen for allowing a user to select whether or not to write the received communication setting information into the specific recording region of the recording medium,
   wherein the writing unit writes the received communication setting information into the specific recording region in a case where an option for writing the communication setting information into the specific recording region of the recording medium has been selected in the selection screen.

5. The communication apparatus according to claim 1, wherein in a case where the holding unit holds the communication setting information, the writing unit automatically writes the communication setting information into the specific recording region of the recording medium in response to the determination unit determining that the recording medium connected to the connection unit has the communication function.

6. The communication apparatus according to claim 1, further comprising: a unit configured to automatically display, in response to the determination unit determining that the recording medium connected to the connection unit has the communication function, a selection screen for allowing a user to select whether or not the writing unit writes the communication setting information into the specific recording region of the recording medium, in a case where the holding unit holds the communication setting information,
   wherein the writing unit writes the communication setting information into the specific recording region in a case where an option for writing the communication setting information into the specific recording region of the recording medium has been selected in the selection screen.

7. The communication apparatus according to claim 1, wherein the communication control unit controls the wireless communication unit to send data recorded in the recording medium connected to the connection unit to the external apparatus, and wherein the communication control unit controls the wireless communication unit to stop the sending before the communication setting information is written by the writing unit.

8. The communication apparatus according to claim 1, further comprising:
an image capturing unit configured to obtain image data by capturing an image of a subject; and
a recording unit configured to record the image data into the recording medium connected to the connection unit.

9. The communication apparatus according to claim 1, wherein the communication setting information includes an SSID, information indicating an encryption scheme, and an encryption key.

10. A control method for a communication apparatus that includes a holding unit configured to hold communication setting information for communicating wirelessly with an external apparatus, a communication control unit configured to control a wireless communication unit to communicate wirelessly with the external apparatus using the communication setting information held by the holding unit, and a connection unit configured to connect to a recording medium, the method comprising:
determining whether or not the recording medium connected to the connection unit has a communication function for communicating wirelessly with an apparatus, which is different from the communication apparatus, using communication setting information that has been written into a specific recording region of the recording medium; and
writing the communication setting information held by the holding unit into the specific recording region of the recording medium in a case where it has been determined that the recording medium connected to the connection unit has the communication function.

11. The control method according to claim 10, further comprising receiving the communication setting information from the external apparatus,
wherein the holding unit holds the received communication setting information, and
wherein the step of writing writes the received communication setting information into the specific recording region of the recording medium in response to the received communication setting information being held by the holding unit.

12. The control method according to claim 11, wherein the communication apparatus comprises an operating unit configured to allow a user to instruct the communication setting information to be received from the external apparatus,
wherein the external apparatus includes an operating unit configured to allow the user to instruct the communication setting information to be sent to the communication apparatus, and
wherein the step of receiving receives the communication setting information from the external apparatus in response to the operating unit of the communication apparatus and the operating unit of the external apparatus being operated at the same period of time.

13. The control method according to claim 10, further comprising:
receiving the communication setting information from the external apparatus; and
displaying, in response to the received communication setting information being held by the holding unit, a selection screen for allowing a user to select whether or not to write the received communication setting information into the specific recording region of the recording medium,
wherein the step of writing writes the received communication setting information into the specific recording region in a case where an option for writing the communication setting information into the specific recording region of the recording medium has been selected in the selection screen.

14. The control method according to claim 10, wherein in a case where the holding unit holds the communication setting information, the step of writing automatically writes the communication setting information into the specific recording region of the recording medium in response to determining, in the step of determining, that the recording medium connected to the connection unit has the communication function.

15. The control method according to claim 10, further comprising automatically displaying, in response to determining, in the step of determining, that the recording medium connected to the connection unit has the communication function, a selection screen for allowing a user to select whether or not the step of writing writes the communication setting information into the specific recording region of the recording medium, in a case where the holding unit holds the communication setting information,
wherein the step of writing writes the communication setting information into the specific recording region in a case where an option for writing the communication setting information into the specific recording region of the recording medium has been selected in the selection screen.

16. The control method according to claim 10, wherein the communication control unit controls the wireless communication unit to send data recorded in the recording medium connected to the connection unit to the external apparatus, and
wherein the communication control unit controls the wireless communication unit to stop the sending before the communication setting information is written by the writing unit.

17. The control method according to claim 10, further comprising:
obtaining image data by capturing an image of a subject; and
recording the image data into the recording medium connected to the connection unit.

18. The control method according to claim 10, wherein the communication setting information includes an SSID, information indicating an encryption scheme, and an encryption key.

19. A non-transitory computer-readable storage medium for storing a program to cause a computer to execute a control method for a communication apparatus that includes a holding unit configured to hold communication setting information for communicating wirelessly with an external apparatus, a communication control unit configured to control a wireless communication unit to communicate wirelessly with the external apparatus using the communication setting information held by the holding unit, and a connection unit configured to connect to a recording medium, the method comprising:
determining whether or not the recording medium connected to the connection unit has a communication function for communicating wirelessly with an apparatus, which is different from the communication apparatus, using communication setting information that has been written into a specific recording region of the recording medium; and writing the communication setting information held by the holding unit into the specific recording region of the recording medium in a case where it has been determined that the recording medium connected to the connection unit has the communication function.

\* \* \* \* \*